(12) United States Patent
Tsuchiya

(10) Patent No.: US 11,556,434 B2
(45) Date of Patent: Jan. 17, 2023

(54) REAL-TIME COMMUNICATION PROCESSING SYSTEM AND REAL-TIME COMMUNICATION PROCESSING METHOD

(71) Applicant: Yokogawa Electric Corporation, Musashino (JP)

(72) Inventor: Masanobu Tsuchiya, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 184 days.

(21) Appl. No.: 17/064,702

(22) Filed: Oct. 7, 2020

(65) Prior Publication Data

US 2021/0103504 A1 Apr. 8, 2021

(30) Foreign Application Priority Data

Oct. 8, 2019 (JP) .............................. JP2019-185258

(51) Int. Cl.
*G06F 11/14* (2006.01)
*G06F 11/07* (2006.01)
*G06F 9/455* (2018.01)
*G06F 11/20* (2006.01)

(52) U.S. Cl.
CPC ...... *G06F 11/1484* (2013.01); *G06F 9/45558* (2013.01); *G06F 11/0772* (2013.01); *G06F 11/203* (2013.01); *G06F 2009/45591* (2013.01); *G06F 2009/45595* (2013.01)

(58) Field of Classification Search
CPC ............. G06F 11/1484; G06F 11/0772; G06F 11/203; G06F 9/45558; G06F 2009/45595; G06F 2009/45591
See application file for complete search history.

(56) References Cited

U.S. PATENT DOCUMENTS

| | | | | |
|---|---|---|---|---|
| 2017/0364387 A1* | 12/2017 | Ahmed | ................. | H04L 41/147 |
| 2018/0060134 A1* | 3/2018 | Bianchini | ............. | G06F 9/5077 |
| 2018/0239648 A1* | 8/2018 | Formanek | ............. | G06F 9/5077 |
| 2019/0377625 A1* | 12/2019 | Chintalapati | .......... | G06N 7/005 |
| 2020/0117494 A1* | 4/2020 | Cortez | .................. | G06F 9/4856 |

OTHER PUBLICATIONS

Kouji Demachi et al., "Vnet/IP Real-Time Plant Network System", Yokogawa Technical Report, 2005, 8pages, vol. 49, No. 2.

\* cited by examiner

*Primary Examiner* — Jigar P Patel
(74) *Attorney, Agent, or Firm* — Sughrue Mion, PLLC

(57) ABSTRACT

In a real-time communication processing system of the present disclosure, at least one computer transmits a notification to a management apparatus when a virtual machine on the computer has the possibility of experiencing unstable operation related to real-time communication processing. When a virtual processor is free, the management apparatus instructs the computer to allocate the virtual processor to the virtual machine that has the possibility of experiencing unstable operation. When a virtual processor is not free, the management apparatus instructs the computer to allocate a virtual processor, secured by live migration of a virtual machine capable of live migration, to the virtual machine that has the possibility of experiencing unstable operation.

7 Claims, 8 Drawing Sheets

FIG. 6

| Operation priority | Live migration capability | Virtual machine ID | Operating application | Notes |
|---|---|---|---|---|
| 1 | Not capable | VM1 | — | — |
| 1 | Not capable | VM3 | — | Running on two machines, VM3 and VM4 |
| 2 | Capable | * | Application to coordinate with maintenance personnel tablet | — |
| 2 | Not capable | VM2 | — | — |
| 3 | Not capable | VM4 | — | Running on two machines, VM3 and VM4 |
| 4 | Capable | * | I/O module predictive maintenance application | Operating cycle of once per week |
| 5 | Capable | VM5, VM6 | Application to generate summary of large volume trend data | Only executed when resources are free |

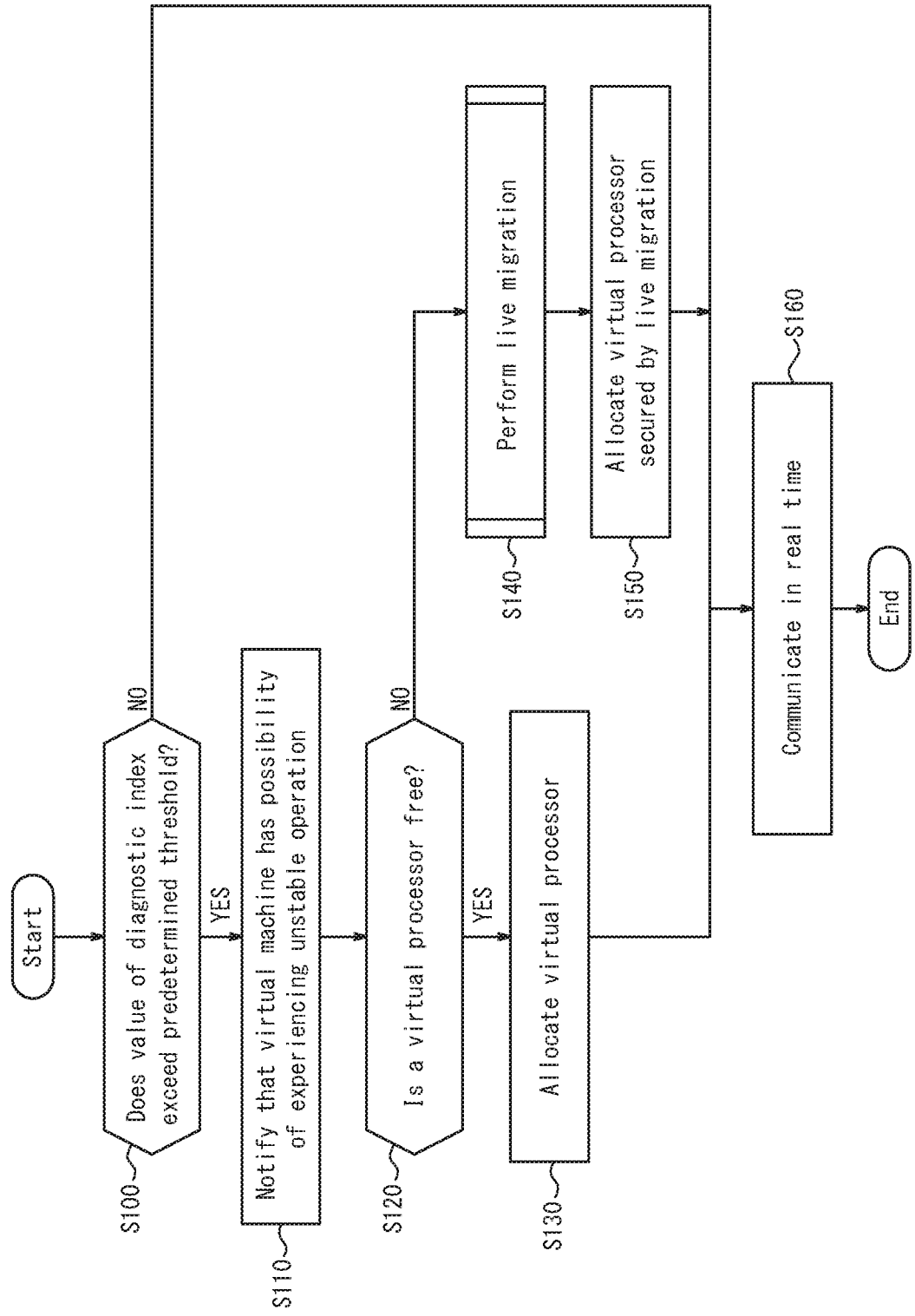

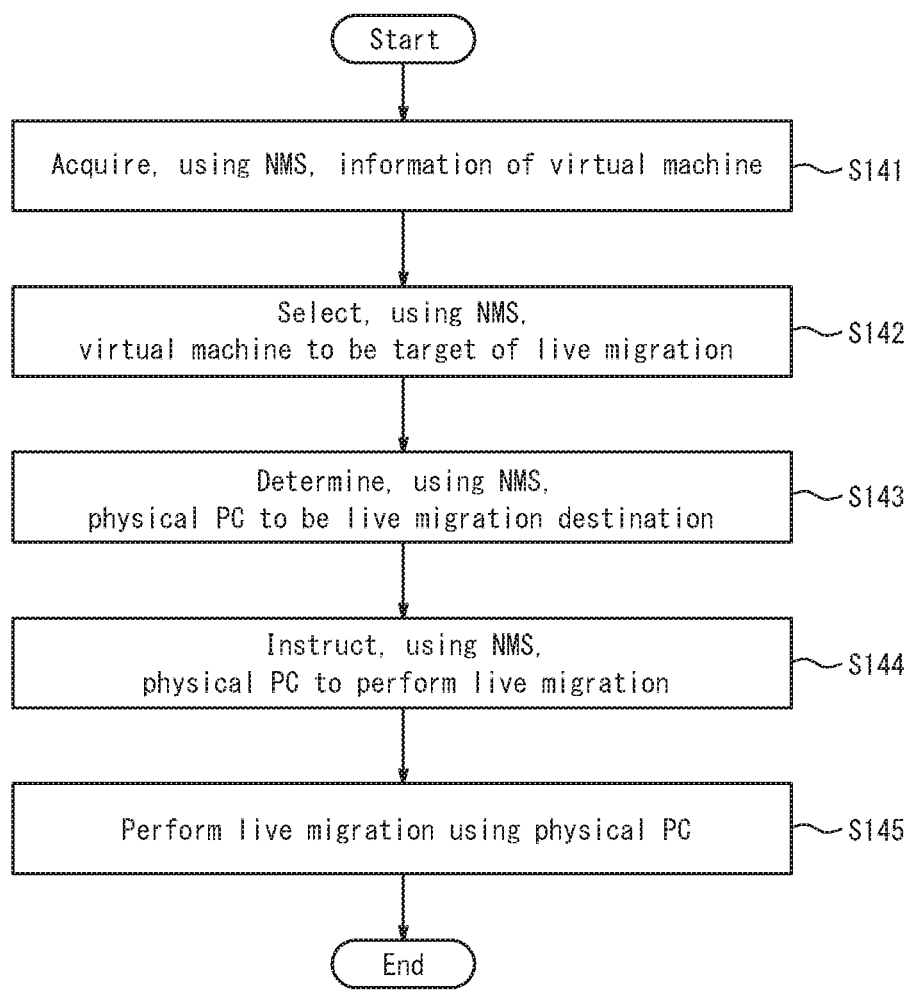

REAL-TIME COMMUNICATION PROCESSING SYSTEM AND REAL-TIME COMMUNICATION PROCESSING METHOD

CROSS-REFERENCE TO RELATED APPLICATION

The present application claims priority to and the benefit of Japanese Patent Application No. 2019-185258 filed Oct. 8, 2019, the entire contents of which are incorporated herein by reference.

TECHNICAL HELD

The present disclosure relates to a real-time communication processing system and a real-time communication processing method.

BACKGROUND

Real-time communication is required in particular in production control systems or the like. One method for communicating in real time is to use a standard communication technique such as Ethernet or Internet protocol (IP).

To achieve real-time communication, non-patent literature (NPL) 1 discloses a technique to avoid packet loss by, for example, allocating a time slot to each transmitting station. The technique in NPL 1 uses an open standard protocol, as illustrated in FIG. 4, for example, to enable a network configuration with multivendor equipment.

CITATION LIST

Non-Patent Literature

NPL 1: Koji Demachi et al., "Vnet/IP Real-time Plant Network System", Yokogawa Technical Report, Vol. 49, No. 2, 2005

SUMMARY

A real-time communication processing system according to an embodiment is to be used in a production control system and includes a plurality of computers and a management apparatus capable of communicating with each computer. At least one virtual machine operates on at least one computer among the plurality of computers. The at least one computer is configured to transmit a notification to the management apparatus when a virtual machine on the computer has a possibility of experiencing unstable operation related to real-time communication processing. When a virtual processor of the computer that transmitted the notification is free, the management apparatus is configured to instruct the computer that transmitted the notification to allocate the virtual processor to the virtual machine that has the possibility of experiencing unstable operation. When a virtual processor of the computer that transmitted the notification is not free, the management apparatus is configured to instruct the computer that transmitted the notification to allocate, to the virtual machine that has the possibility of experiencing unstable operation, a virtual processor secured by live migration of a virtual machine capable of live migration on the computer that transmitted the notification.

A real-time communication processing method according to an embodiment is to be used in a production control system and includes using at least one computer to transmit a notification to a management apparatus when a virtual machine on the computer has a possibility of experiencing unstable operation related to real-time communication processing, using the management apparatus, when a virtual processor of the computer that transmitted the notification is free, to instruct the computer that transmitted the notification to allocate the virtual processor to the virtual machine that has the possibility of experiencing unstable operation, and using the management apparatus, when a virtual processor of the computer that transmitted the notification is not free, to instruct the computer that transmitted the notification to allocate, to the virtual machine that has the possibility of experiencing unstable operation, a virtual processor secured by live migration of a virtual machine capable of live migration on the computer that transmitted the notification.

BRIEF DESCRIPTION OF THE DRAWINGS

In the accompanying drawings:

FIG. 6 illustrates an operation priority table;

FIG. 7 is a flowchart illustrating processing procedures of the real-time communication processing system of FIG. 4; and FIG. 8 is a flowchart illustrating details of the processing in step S140 of FIG. 7.

DETAILED DESCRIPTION

Figure 1:
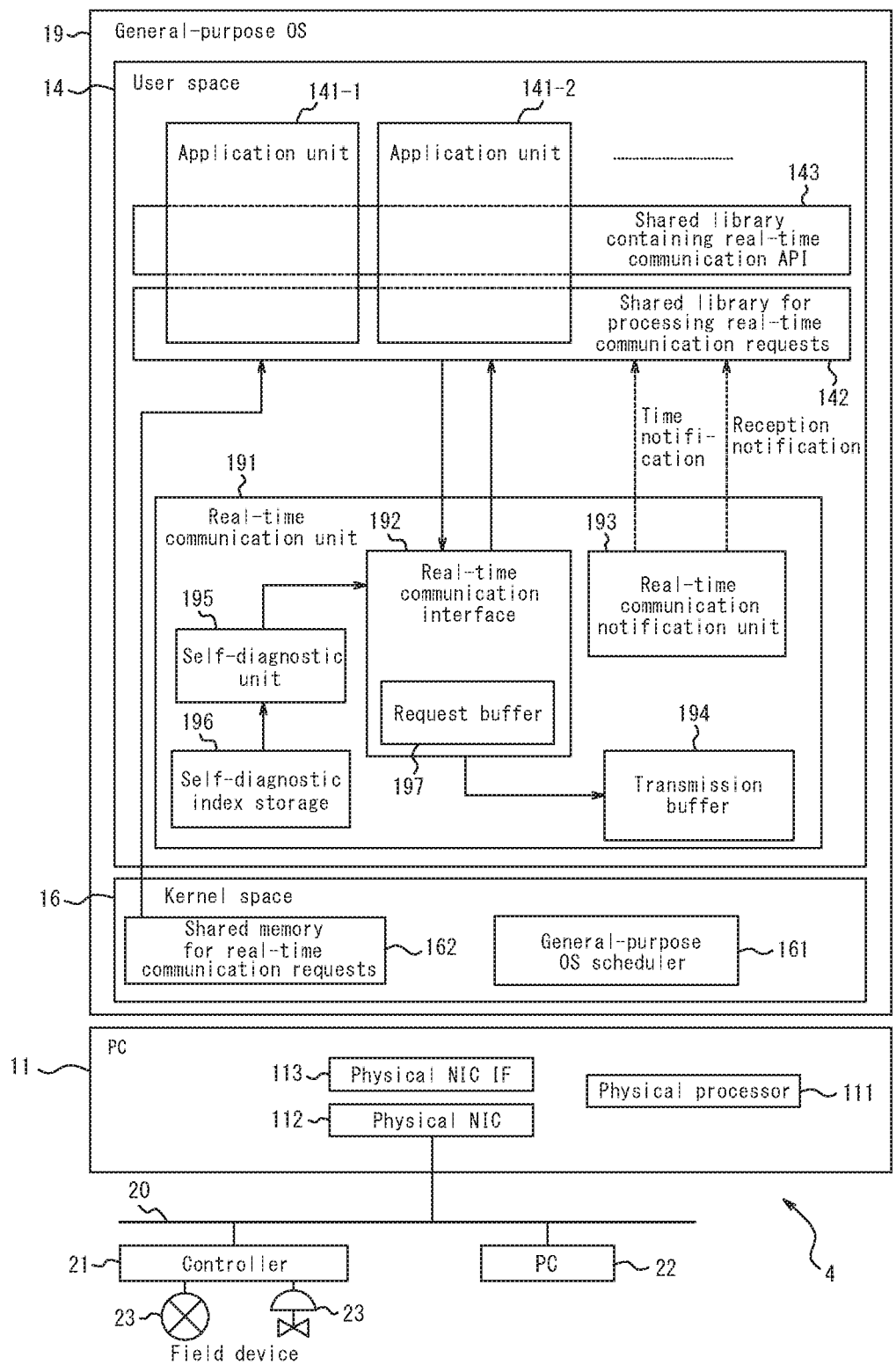
FIG. 1 is a functional block diagram illustrating the configuration of a communication processing apparatus according to a comparative example.

In a network system configured for controlling a plant or the like, demand exists for using general-purpose products to implement devices belonging to the network system. In particular, incorporating general-purpose products in devices belonging to the network system while ensuring real-time responsiveness is expected to reduce the price of devices and stabilize supply. For example, a computer could be used as a communication processing apparatus that communicates in real time, and an operating system (OS) such as Windows® (Windows is a registered trademark in Japan, other countries, or both), which is more general-purpose than Linux® (Linux is a registered trademark in Japan, other countries, or both) or the like, could be used to control programs operating on the computer.

The following problems arise on the above-described communication processing apparatus, however, when a general-purpose OS scheduler is used as is to allocate computational resources to a plurality of tasks operating simultaneously in parallel. For example, a known general-purpose OS scheduler might not be able to allocate computational resources appropriately on a communication processing apparatus that includes an application unit for executing processing for plant control and a real-time communication unit for processing communication requests from the application unit in real-time. Specifically, to ensure real-time responsiveness on a communication processing apparatus that uses a general-purpose OS scheduler, the priority of the task of the real-time communication unit is set higher than the priority of the task of the application unit. In general, however, when CPU usage of a high priority task exceeds a predetermined threshold, a general-purpose OS scheduler operates under logic that does not provide the task with computational resources, but rather allocates computational resources to a task with a lower priority. The real-time communication unit therefore cannot use sufficient computational resources to process communication requests from the application unit. This leads to the problem of an inability to respond in real time.

It would therefore be helpful to provide a real-time communication processing system and a real-time communication processing method capable of ensuring the real-time responsiveness necessary for a production control system while using a general-purpose OS scheduler.

A real-time communication processing system according to an embodiment is to be used in a production control system and includes a plurality of computers and a management apparatus capable of communicating with each computer. At least one virtual machine operates on at least one computer among the plurality of computers. The at least one computer is configured to transmit a notification to the management apparatus when a virtual machine on the computer has a possibility of experiencing unstable operation related to real-time communication processing. When a virtual processor of the computer that transmitted the notification is free, the management apparatus is configured to instruct the computer that transmitted the notification to allocate the virtual processor to the virtual machine that has the possibility of experiencing unstable operation. When a virtual processor of the computer that transmitted the notification is not free, the management apparatus is configured to instruct the computer that transmitted the notification to allocate, to the virtual machine that has the possibility of experiencing unstable operation, a virtual processor secured by live migration of a virtual machine capable of live migration on the computer that transmitted the notification.

In this way, when no virtual processor is free, a virtual processor secured by live migration is allocated to the virtual machine that has a possibility of experiencing unstable operation. The real-time responsiveness required for a production control system can thus be ensured.

In an embodiment, the management apparatus may be configured to select a virtual machine with a low operation priority as the virtual machine capable of live migration.

In this way, a virtual machine with a low operation priority is selected as the virtual machine capable of live migration. Real-time responsiveness can thus be ensured while reducing the effect on the production control system.

In an embodiment, the management apparatus may be configured to determine a live migration destination of the virtual machine based on an allocation status of the virtual processor relative to the virtual machine operating on the at least one computer.

When the live migration destination is determined in this way based on the allocation status of the virtual processor, the effect of live migration on the production control system can be further reduced.

In an embodiment, the management apparatus may be configured to determine a live migration destination of the virtual machine based on processing performance of the plurality of computers.

When the live migration destination is determined in this way based on the processing performance of the plurality of computers, the effect of live migration on the production control system can be further reduced.

In an embodiment, the management apparatus may be configured to determine a live migration destination of the virtual machine based on an amount of virtual resources of the plurality of computers.

When the live migration destination is determined in this way based on the amount of virtual resources of the plurality of computers, the effect of live migration on the production control system can be further reduced.

In an embodiment, the at least one computer may be configured to judge whether the virtual machine has the possibility of experiencing unstable operation based on a diagnostic index related to the real-time communication processing.

A real-time communication processing method according to an embodiment is to be used in a production control system and includes using at least one computer to transmit a notification to a management apparatus when a virtual machine on the computer has a possibility of experiencing unstable operation related to real-time communication processing, using the management apparatus, when a virtual processor of the computer that transmitted the notification is free, to instruct the computer that transmitted the notification to allocate the virtual processor to the virtual machine that has the possibility of experiencing unstable operation, and using the management apparatus, when a virtual processor of the computer that transmitted the notification is not free, to instruct the computer that transmitted the notification to allocate, to the virtual machine that has the possibility of experiencing unstable operation, a virtual processor secured by live migration of a virtual machine capable of live migration on the computer that transmitted the notification.

In this way, when no virtual processor is free, a virtual processor secured by live migration is allocated to the virtual machine that has a possibility of experiencing unstable operation. The real-time responsiveness required for a production control system can thus be ensured.

The present disclosure provides a real-time communication processing system and a real-time communication processing method capable of ensuring the real-time responsiveness necessary for a production control system while using a general-purpose OS scheduler.

Embodiments of the present disclosure are described below with reference to the drawings. Identical reference signs in the drawings indicate identical or equivalent constituent elements.

First, a configuration example of a communication processing apparatus 4 is described with reference to FIG. 1 for the sake of comparison.

As illustrated in FIG. 1, the communication processing apparatus 4 is configured on a computer (physical PC) 11, which is hardware. The physical PC 11 includes a physical processor 111, a physical NIC 112, and a physical NIC IF 113. The physical PC 11 may include another constituent element, such as memory implemented using a semiconductor or a magnetic recording medium. The physical PC 11 is connected to a control network 20 via the physical NIC 112. The control network 20 is a network for communication between devices that form a production control system. Devices such as a controller 21 and a PC 22 are connected to the control network 20. The PC 22 can, for example, communicate with the controller 21 or the like over the control network 20. A plurality of field devices 23 are connected to the controller 21. The plant is controlled by control of the field devices 23. The field devices 23 are, for example, sensors such as a flow meter, temperature gauge, humidity gauge, or pressure gauge, or devices such as a valve, a pump, or an actuator. PC stands for "personal computer". NIC stands for "network interface card". An NIC may also simply be referred to as a "network card". IF stands for "interface".

The physical processor 111 consecutively fetches and executes commands included in a program loaded into memory. Examples of the physical processor include a physical CPU. Any number of cores may be included in the physical CPU. CPU stands for "central processing unit". The physical PC 11 may include a plurality of physical processors 111. The CPU time of the physical processor 111 is allocated to each function in user space, described below.

The physical NIC 112 has an interface function for communicating with an external device via the control network 20 connected to the physical PC 11. The physical NIC 112 may be a general-purpose NIC.

The physical NIC IF 113 provides an interface between programs or the like on the physical PC 11 and the physical NIC 112.

A general-purpose OS 19 operates on the physical PC 11. The general-purpose OS 19 includes a user space 14 and a kernel space 16. OS stands for "operating system". Configuring the communication processing apparatus 4 by using a general-purpose OS 19 can reduce the cost of the communication processing apparatus 4 and achieve stable supply. Examples of the general-purpose OS 19 include a Windows® family OS, released by Microsoft Corporation (USA) as an OS for PCs.

A general-purpose OS scheduler 161 and a shared memory 162 for real-time communication requests are located in the kernel space 16. A shared memory may also be present in the kernel space 16 for use as necessary when information is to be shared between tasks operating in the user space 14.

In accordance with the priority of each function (task, program) operating simultaneously in parallel in the user space 14, the general-purpose OS scheduler 161 allocates computational resources as necessary and manages operation of each function. Computational resources as used herein are typically CPU time (CPU resources) but may include resources other than CPU time. For example, the computational resources include allocated memory, input/output processing means, and the like. The general-purpose OS scheduler 161 is not a real-time scheduler. Only one user space 14 is illustrated in FIG. 1, but the general-purpose OS scheduler 161 may manage a plurality of user spaces.

The shared memory 162 for real-time communication requests is memory capable of being accessed by all of the tasks operating in the user space 14. A buffer is provided inside the shared memory 162 for real-time communication requests. A shared library 142 for processing real-time communication requests, described below, temporarily stores communication requests or the like from application units 141-1, 141-2, . . . , in the buffer. The shared memory 162 for real-time communication requests is provided outside of the user space 14 and is mapped to a predetermined location inside the memory space of the application units 141-1, 141-2, . . . . Consequently, the application units 141-1, 141-2, . . . can access the shared memory 162 for real-time communication requests.

The application units 141-1, 141-2, . . . (application units 141), the shared library 142 for processing real-time communication requests, a shared library 143 containing a real-time communication API, and a real-time communication unit 191 are located in the user space 14. API stands for "application programming interface". The application units 141, the shared library 142 for processing real-time communication requests, the shared library 143 containing the real-time communication API, and the real-time communication unit 191 can be implemented using programs and memory. The programs are executed by the physical processor 111 allocated as appropriate by the general-purpose OS scheduler 161. The memory is implemented using a semiconductor or a magnetic recording medium, for example. The functions executed in the user space 14 need not always use the memory. Functions that only record information and do not execute processing do not need to use a program.

The application units 141 execute processing to control a plant and devices, for example. The application units 141 run software related to a human machine interface (HMI) for displaying measurement data of a plant and performing operations on the plant, an engineering server (ENG) on which the control program of the controller that controls the plant is created, a gateway, and applications of the controller or the like that controls the plant, for example. A plurality of application units 141 may operate simultaneously in parallel. The application unit 141 temporarily stores a communication request in the shared memory 162 for real-time communication requests shared by the plurality of application units 141. Subsequently, the application unit 141 passes the communication request retrieved from the shared memory 162 for real-time communication requests to the real-time communication unit 191. The communication request from the application unit 141 to the real-time communication unit 191 is to establish or release a logical communication channel, to transmit or receive a frame (a logical unit of data transmission/reception; also referred to as a packet), or the like. Any number of pieces of application software may operate in the user space 14.

The library functions of the shared library 142 for processing real-time communication requests and the shared library 143 containing the real-time communication API are incorporated into the application units 141. The functions of the shared library 142 for processing real-time communication requests and the shared library 143 containing the real-time communication API are linked to application logic as appropriate.

The shared library 142 for processing real-time communication requests may be statically linked to the application units 141 or may operate as an independent task. The shared library 142 for processing real-time communication requests includes the functions of logic for real-time communication request reception, logic for real-time communication transmission, and logic for real-time communication reception.

The logic for real-time communication request reception receives communication requests that arrive from the application logic of each application unit 141 via the shared library 143 containing the real-time communication API. The logic for real-time communication request reception aggregates the received requests and writes transmission frames or the like attached to the requests (such as transmission requests) in a buffer in accordance with the priority of the transmission requests. Requests can thus be made to the real-time communication unit 191 after the communication requests from the application units 141 are organized by their priority. The buffer is located in the shared memory 162 for real-time communication requests. The logic for real-time communication request reception notifies the logic for real-time communication transmission, described below, when a transmission frame is stored in the buffer inside the shared memory 162 for real-time communication requests.

Upon receiving notification from the logic for real-time communication request reception, the logic for real-time communication transmission retrieves the transmission frame from the buffer inside the shared memory 162 for real-time communication requests and passes the transmission frame to the real-time communication unit 191. Specifically, the logic for real-time communication transmission transmits the transmission frame by writing the transmission frame to a request buffer 197 included in a real-time communication interface 192 in the real-time communication unit 191.

Upon receiving a reception notification from a real-time communication notification unit 193 included in the real-time communication unit 191, the logic for real-time communication reception accepts a frame received from an external source and writes the frame in the buffer inside the real-time communication request shared memory 162. The logic for real-time communication reception also notifies the logic for real-time communication request reception of receipt of the frame. Based on the notification from the logic for real-time communication reception, the logic for real-time communication request reception retrieves the received frame from the buffer inside the real-time communication request shared memory 162 and returns the received frame to the application unit 141 that issued a reception request.

The shared library 143 containing the real-time communication API is a shared library including an API for the application unit 141 to communicate in real time. The application unit 141 may statically link the functions of the shared library 143 containing the real-time communication API or may dynamically link the functions of the shared library 143 containing the real-time communication API at the time of execution.

The real-time communication unit 191 transmits and receives data in real time based on communication requests from the application units 141. By the nature of the processing executed by the real-time communication unit 191, the timing of transmission and reception of frames and the like needs to be matched to the controller 21 or the PC 22, and real-time responsiveness is required. As used herein, "real-time responsiveness" refers to a communication request from the real-time communication unit 191 to the controller 21 or the PC 22 being completed within a predetermined time or to a response being returned to the real-time communication unit 191 within a predetermined time when the communication request is not completed within the predetermined time. Such a response includes notification of an error, for example. The "predetermined time" differs by field of application but may, for example, be within a range of several milliseconds to several hundred milliseconds. The task priority of the real-time communication unit 191 is set higher than the task priority of the application units 141. Details of the real-time communication unit 191 are provided below.

The real-time communication unit 191 includes the real-time communication interface 192, the real-time communication notification unit 193, a transmission buffer 194, a self-diagnostic unit 195, and a self-diagnostic index storage 196. The real-time communication interface 192 includes the request buffer 197.

The request buffer 197 at least temporarily accumulates communication requests from the application units 141. The communication requests from the application units 141 are accumulated in the request buffer 197 via the shared library 142 for processing real-time communication requests and the shared library 143 containing the real-time communication API. The communication requests accumulated in the request buffer 197 are retrieved by the real-time communication interface 192 and stored in the transmission buffer 194. The request buffer 197 is fundamentally first in, first out (FIFO), but a communication request may be assigned a higher processing order based on factors such as the priority of the communication request.

The transmission buffer 194 at least temporarily accumulates communication requests from the real-time communication interface 192. The communication requests accumulated in the transmission buffer 194 are transmitted sequentially. The transmission buffer 194 is fundamentally first in, first out (FIFO), but a communication request may be assigned a higher processing order based on factors such as the priority of the communication request.

The real-time communication interface 192 receives communication requests from the application units 141 and provides a response to the communication requests to the application units 141 via the shared library 142 for processing real-time communication requests and the shared library 143 containing the real-time communication API. Specifically, when a communication request is a transmission request, the real-time communication interface 192 executes transmission processing by temporarily accumulating the transmission request from the application unit 141 in the request buffer 197, retrieving the communication request from the request buffer 197, and storing the communication request in the transmission buffer 194. When the real-time communication interface 192 receives notification from the self-diagnostic unit 195, described below, of a possibility of unstable operation, the real-time communication interface 192 waits for a designated time when retrieving the transmission request from the request buffer 197. In other words, the real-time communication interface 192 performs control so that transmission requests accumulated in the request buffer 197 do not excessively flow into the transmission buffer 194. Even if the request buffer 197 receives a large number of transmission requests, the real-time communication interface 192 therefore does not process the transmission requests upon each receipt. This enables the real-time communication interface 192 to reduce the possibility of unstable operation when the real-time communication unit 191 has such a possibility of experiencing unstable operation. The designated time can be determined in advance. The "designated time" differs by field of application but may, for example, be within a range of several milliseconds to several hundred milliseconds.

The self-diagnostic unit 195 detects a diagnostic index related to processing by the real-time communication unit 191. When the value of the diagnostic index exceeds a predetermined threshold, the self-diagnostic unit 195 judges that the real-time communication unit 191 has a possibility of experiencing unstable operation and notifies the real-time communication interface 192 accordingly. The "diagnostic index" is, for example, CPU usage or processing response time. The self-diagnostic unit 195 refers to the self-diagnostic index storage 196 when detecting the diagnostic index.

The self-diagnostic index storage 196 stores a plurality of pairs of the above-described diagnostic index and a threshold for the diagnostic index. For example, the self-diagnostic index storage 196 stores a threshold of the CPU usage of the real-time communication unit 191, a threshold of the processing response time (such as the number of retries for a transmission frame), or another threshold. These thresholds can be set by an external source.

The real-time communication notification unit 193 notifies the shared library 142 for processing real-time communication requests. Specifically, the real-time communication notification unit 193 transmits a time notification to the shared library 142 for processing real-time communication requests over a constant cycle. Processing logic for real-time communication requests in the shared library 142 for processing real-time communication requests is activated upon each time notification and confirms whether processing for transmitting a frame has timed out. The processing for frame transmission times out when a predetermined time elapses without a transmission completion notification being issued to the shared library 142 for processing real-time communication requests by use of a reception notification. For example, this occurs due to an acknowledgement not being returned to the real-time communication unit 191 from the external device that is the recipient of transmission. The real-time communication interface 192 can be instructed to retransmit a frame by the real-time communication notification unit 193 providing a time notification related to transmission timeout. Furthermore, upon receipt of a frame transmitted front an external device to the communication processing apparatus, the real-time communication notification unit 193 provides a receipt notification to the logic for real-time communication request reception and processing logic for real-time communication reception in the shared library 142 for processing real-time communication requests. The processing logic for real-time communication reception in the shared library 142 for processing real-time communication requests can thereby retrieve the received frame.

Figure 2:
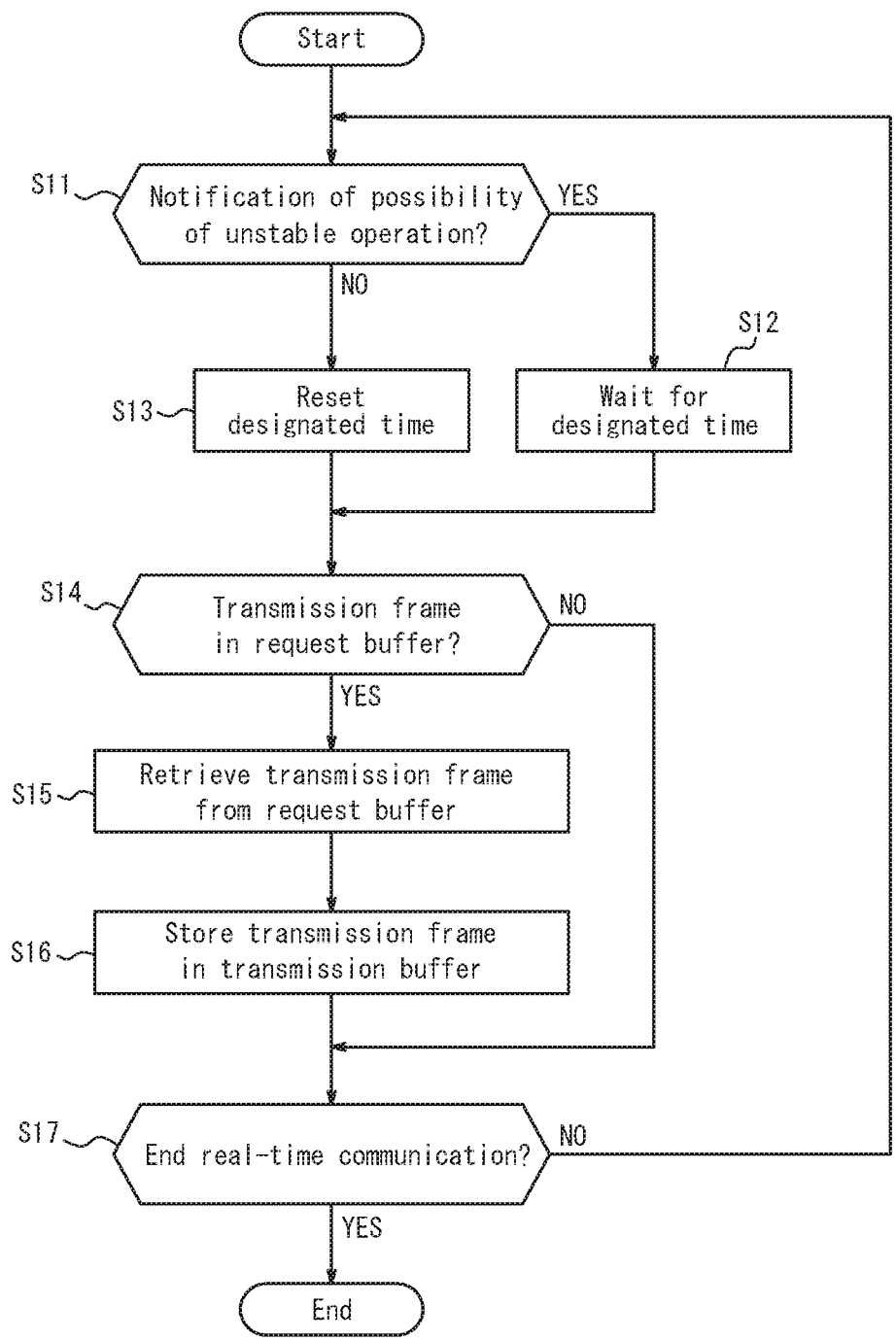
FIG. 2 is a flowchart illustrating processing procedures of a real-time communication interface of FIG. 1.

Next, processing procedures for each function of the communication processing apparatus 4 are described. FIG. 2 is a flowchart illustrating operation procedures of the real-time communication interface 192.

First, in step S11, the real-time communication interface 192 judges whether a notification of the possibility of unstable operation has been received from the self-diagnostic unit 195. When a notification of the possibility of unstable operation has been received (step S11: YES), the processing proceeds to step S12. When a notification of the possibility of unstable operation has not been received (step S11: NO), the processing proceeds to step S13.

In the case of proceeding to step S12, the real-time communication interface 192 waits for the designated time in step S12. The real-time communication interface 192 consequently waits for the designated time before transitioning to step S14. While the real-time communication interface 192 waits in step S12, computational resources are allocated to other processing in the real-time communication unit 191 and to processing of the application units 141. The processing load of real-time communication unit 191 is therefore reduced as compared to when not waiting. After the designated time elapses from when the real-time communication interface 192 starts waiting, computational resources are again allocated to the real-time communication interface 192, and the processing proceeds to step S14. The general-purpose OS scheduler 161 performs the above-described allocation of computational resources.

In the case of proceeding to step S13, the real-time communication interface 192 resets the designated time to an initial value in step S13. The processing proceeds to step S14 after completion of step S13.

Next, in step S14, the real-time communication interface 192 judges whether there is a transmission frame requested by an application unit 141. Specifically, the real-time communication interface 192 refers to the request buffer 197 and judges whether there is a transmission frame. When there is a transmission frame (step S14: YES), the processing proceeds to step S15. When there is no transmission frame (step S14: NO), the processing proceeds to step S17.

In the case of proceeding to step S15, the real-time communication interface 192 retrieves one transmission frame from the request buffer 197 in step S15. When a plurality of transmission frames can be retrieved and transmitted together, however, the real-time communication interface 192 retrieves a predetermined number or less, as determined in advance, of transmission frames from the request buffer 197. The transmission frames in the request buffer 197 are deleted as appropriate after being successfully transferred to the transmission buffer.

Next, in step S16, the real-time communication interface 192 stores the transmission frames retrieved in step S15 in the transmission buffer 194. The transmission frames stored in the transmission buffer 194 are sequentially transmitted by the real-time communication unit 191. Details are provided below with reference to FIG. 3.

Next, in step S17, the real-time communication interface 192 judges whether to end real-time communication. For example, real-time communication is ended when a higher level management function in the communication processing apparatus 4 has instructed to end real-time communication, when an end command has been inputted from an operator or the like, or when it is judged that real-time communication should be ended as a result of analysis of an interrupt caused by an error event or the like. When real-time communication is to be ended (step S17: YES), the present processing ends. When real-time communication is not to be ended (step S17: NO), the processing returns to step S11, and the above-described processing is repeated.

Figure 3:
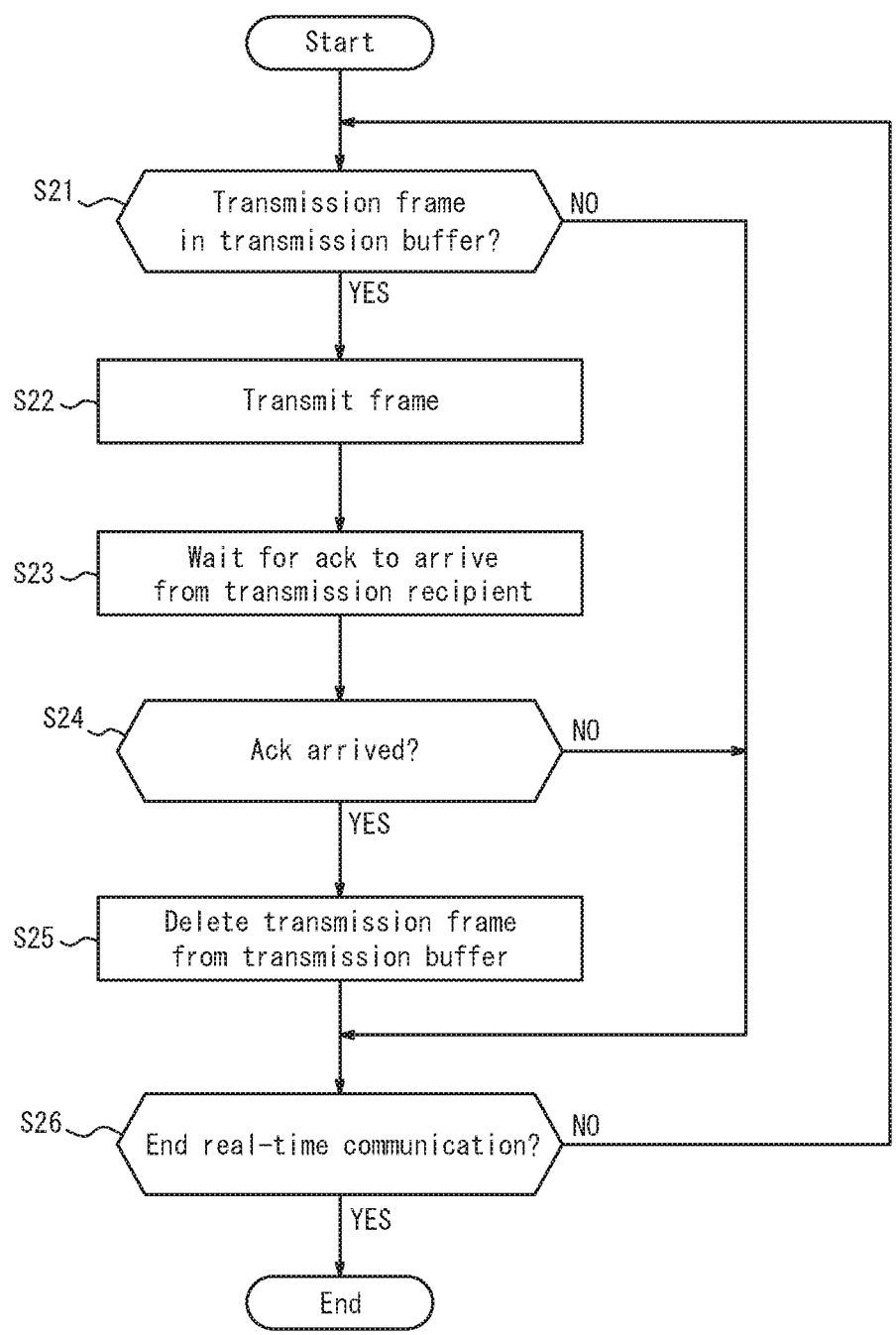
FIG. 3 is a flowchart illustrating processing procedures of a real-time communication unit of FIG. 1.

FIG. 3 is a flowchart illustrating operation procedures of the real-time communication unit 191.

First, in step S21, the real-time communication unit 191 judges whether there is a transmission frame in the transmission buffer 194. When there is a transmission frame (step S21: YES), the processing proceeds to step S22. When there is no transmission frame (step S21: NO), the processing jumps to step S26.

In the case of proceeding to step S22, the real-time communication unit 191 retrieves one transmission frame from the transmission buffer 194 and transmits the frame in step S22. When a plurality of transmission frames can be retrieved and transmitted together, however, the real-time communication unit 191 retrieves a predetermined number or less, as determined in advance, of transmission frames from the transmission buffer 194 and transmits the frames.

Subsequently, in step S23, the real-time communication unit 191 waits a predetermined time for the arrival of an acknowledgement (Ack) from the recipient of the frame in step S22 (the receiving end of the frame).

In step S24, the real-time communication unit 191 then judges whether the acknowledgement has arrived. When the acknowledgement has arrived (step S24: YES), i.e. when it is confirmed that the frame was received by the recipient, the processing proceeds to step S25. When the acknowledgement has not arrived (step S24: NO), i.e. when a negative response corresponding to the transmitted frame has arrived, or when the predetermined time has elapsed causing a timeout, the processing jumps to step S26.

In the case of proceeding to step S25, the real-time communication unit 191 deletes the successfully transmitted frame, i.e. the transmission frame for which an acknowledgement was obtained, from the transmission buffer 194 in step S25. When an acknowledgement has not arrived during a certain number of executions of processing, the real-time communication unit 191 may judge that communication with the destination is not possible. In this case, the real-time communication unit 191 may delete the transmission frame from the transmission buffer 194 and cause transmission to fail.

Subsequently, in step S26, the real-time communication unit 191 judges whether to end the processing of the real-time communication unit 191 itself (real-time communication). The conditions for ending the processing of the real-time communication unit 191 are as described with reference to the processing in step S17 of FIG. 2. When real-time communication is to be ended (step S26: YES), the processing of the entire flowchart ends. When real-time communication is not to be ended (step S26: NO), the processing returns to step S21, and the above-described processing is repeated.

In this way, when the possibility of unstable operation exists in the communication processing apparatus 4 according to a comparative example, the real-time communication interface 192 performs control to wait when retrieving a transmission request from the request buffer 197 so that transmission requests accumulated in the request buffer 197 do not excessively flow into the transmission buffer 194. As described below, however, the communication processing apparatus 4 that performs control in this way cannot process the desired amount of data, leading to the problem of a reduction in the processing performance, such as the data transmission amount per unit time, of applications.

In general, the overall processing load in the communication processing apparatus is calculated by Equation (1) below.

$$\text{overall processing load} = \text{(total of processing load of each processor used by process)} / \text{(total of maximum load of all processors)} \quad (1)$$

The following case is described as an example: the total number of processors is two, the maximum load that can be processed on one processor is 100%, the processing loads of the processors are 70% and 50%, and the threshold processing load at which the general-purpose OS scheduler stops processing of a process is 50%. In this case, the overall processing load as calculated by Equation (1) is 60% ((70+50)/(100+100)). Since the overall processing load (60%) exceeds the processing load threshold (50%), real-time responsiveness cannot be ensured. To address this, the communication processing apparatus 4 according to the comparative example reduces the processing load of each processor by waiting, for example, so that the overall processing load does not exceed the processing load threshold. In greater detail, the processing load of each processor after reduction by waiting on the communication processing apparatus 4 according to the comparative example is 40%. The overall processing load as calculated by Equation (1) then becomes 40% ((40+40)/(100+100)), which is smaller than the processing load threshold (50%). The actual total processing load of the processors being used by the process, however, is reduced from 120% (70%+50%) to 80% (40%+40%). Therefore, the communication processing apparatus 4 according to the comparative example cannot process the desired amount of data, leading to the problem of a reduction in the processing performance, such as the data transmission amount per unit time, of applications.

This problem could be addressed as follows. When a virtual machine is operated on a physical PC, and the processing load of the virtual machine exceeds a predetermined threshold, a virtual processor could be allocated to the virtual machine to ensure real-time responsiveness while maintaining the processing performance of application software. In the above-described example, the addition of one virtual processor changes the overall processing load of the virtual machine as follows.

$$\text{overall processing load of virtual machine} = (70+50)/(100+100+100)$$
$$= 120/300$$
$$= 40\%$$

In other words, the allocation of a virtual processor to the virtual machine can reduce the relative processing load of the virtual machine to 40% while maintaining the total processing load of processors used by the process at 120% (70%+50%). Real-time responsiveness can therefore be ensured while the processing capability of the application is maintained. The problem of not being able to ensure real-time responsiveness remains, however, when no virtual processor is free due to all of the virtual processors having been allocated.

The present disclosure describes a real-time communication processing system and a real-time communication processing method capable of ensuring the real-time responsiveness necessary for a production control system while using a general-purpose OS scheduler. Additionally, the present disclosure describes a real-time communication processing system and a real-time communication processing method capable of ensuring the real-time responsiveness necessary for a production control system even when no virtual processor is free.

A real-time communication processing system 1 according to an embodiment of the present disclosure is now described with reference to FIGS. 4 and 5.

Figure 4:
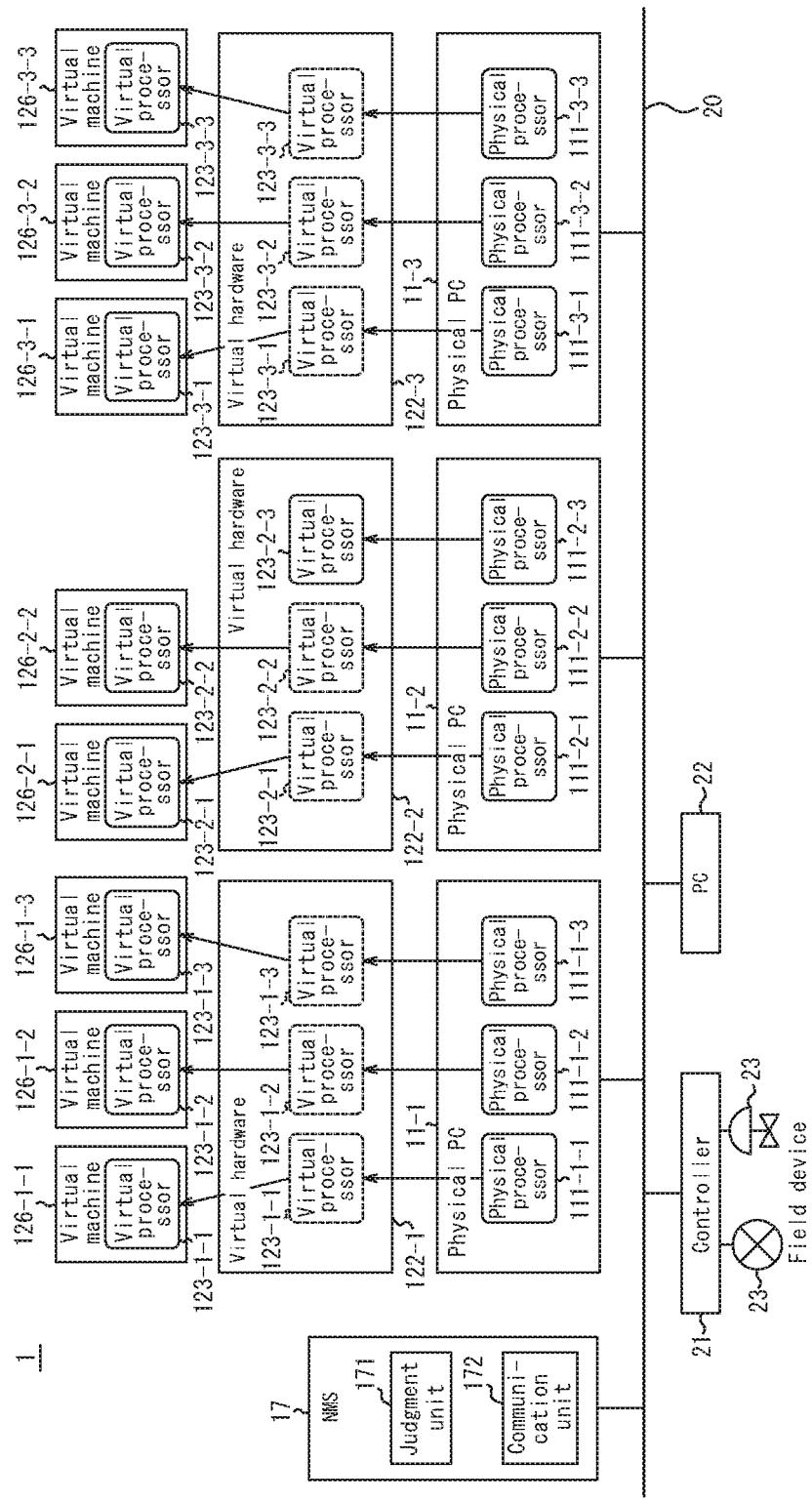
FIG. 4 is a functional block diagram illustrating the configuration of a real-time communication processing system according to an embodiment of the present disclosure.

Referring to FIG. 4, each computer (physical PC) 11-1, 11-2, 11-3, . . . (physical PC 11) is virtualized. As illustrated in FIG. 5, each physical PC 11 includes a virtualization unit 12, and a host OS operates on the physical PC 11. At least one virtual machine operates on the aforementioned host OS on at least one physical PC among the plurality of physical PCs 11. A general-purpose OS can be used as the host OS. Examples of a general-purpose OS include a Windows® family OS, released by Microsoft Corporation (USA) as an OS for PCs. The number of physical PCs 11 is not limited to the example in FIG. 4 and may be any number. A plurality of virtual machines may operate on the below-described physical PC 11 that experiences unstable operation, but a plurality of virtual machines do not necessarily operate on the physical PC 11 that is the live migration destination.

Figure 5:
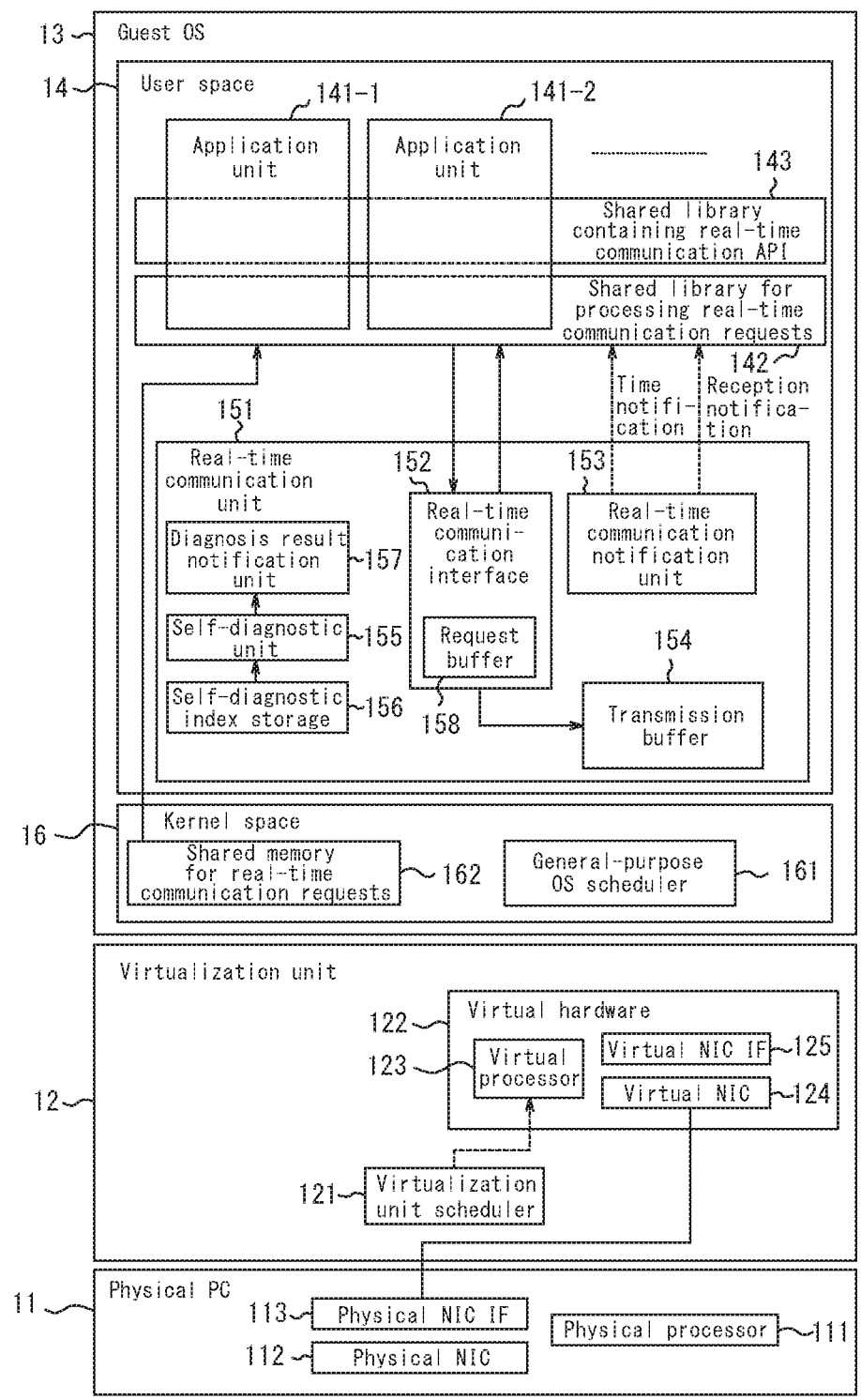
FIG. 5 is a functional block diagram illustrating the detailed configuration of each physical PC of FIG. 4.

Referring to FIG. 5, the virtualization unit 12 includes a virtualization unit scheduler 121 and virtual hardware 122 and controls operations of a plurality of virtual machines implemented with a virtualization technique. While details are provided below, the virtualization unit 12 changes virtual resources by executing commands received from a communication unit 172 of a management apparatus 17, such as a network management system (also referred to as the NMS 17). Allocation of a virtual processor 123 to a virtual machine, deletion of the virtual processor 123 from a virtual machine, and suspension or restarting of a virtual machine are examples of "changing virtual resources". Virtual resources may be changed while a virtual machine is operating. In this case, the change in virtual resources is reflected during operation of the virtual machine on a guest OS 13 operating on the virtual machine.

The virtualization unit scheduler 121 appropriately associates a physical processor 111 and a virtual processor 123 in one-to-one correspondence. Accordingly, a virtual processor 123 being free means that a physical processor 111 included in a physical PC 11 is free, or that a virtual processor 123 included in the virtual hardware 122 is free.

For example, the virtualization unit scheduler 121 associates a core included in the physical CPU with a virtual CPU core in one-to-one correspondence. Any number of cores, one or more, may be included in the physical CPU.

Referring to FIGS. 4 and 5, virtual hardware 122-1, 122-2, 122-3, . . . (virtual hardware 122) is virtual computer hardware implemented by the virtualization unit 12. The virtual hardware 122 includes the virtual processor 123, a virtual NIC 124, and a virtual NIC IF 125. The virtual hardware 122 may include a virtual memory.

Referring to FIG. 5, the virtual processor 123 is a virtual processor implemented by the virtualization unit 12. The virtualization unit scheduler 121 appropriately allocates a physical processor 111 to the task of the virtualization unit 12. The program allocated to the virtual processor 123 thereby operates. In FIG. 4, the virtual processors of the virtual hardware 122-1 on the physical PC 11-1 are indicated as "virtual processors 123-1-1, 123-1-2, 123-1-3". The physical processors included in the physical PC 11-1 are indicated as "physical processors 111-1-1, 111-1-2, 111-1-3". Similarly, the virtual processors of the virtual hardware 122-2 on the physical PC 11-2 are indicated as "virtual processors 123-2-1, 123-2-2, 123-2-3". The physical processors included in the physical PC 11-2 are indicated as "physical processors 111-2-1, 111-2-2, 111-2-3". Similarly, the virtual processors of the virtual hardware 122-3 on the physical PC 11-3 are indicated as "virtual processors 123-3-1, 123-3-2, 123-3-3". The physical processors included in the physical PC 11-3 are indicated as "physical processors 111-3-1, 111-3-2, 111-3-3". The number of physical processors and the number of virtual processors are not limited to the example in FIG. 4 and may be any number.

Referring to FIG. 5, the virtual NIC 124 is a virtual network interface card. In other words, a communication request from the guest OS 13 to the virtual NIC 124 is continued on the physical NIC 112.

The virtual NIC IF 125 is a virtual interface for accessing the virtual NIC 124 from the guest OS 13.

The guest OS 13 operates on each virtual machine on each physical PC 11. The number of guest OSs 13 is not limited to one and may be larger. Each guest OS 13 includes a user space 14 and a kernel space 16. A general-purpose OS can be used as the guest OS 13. Examples of a general-purpose OS include a Windows® family OS, released by Microsoft Corporation (USA) as an OS for PCs.

A general-purpose OS scheduler 161 and a real-time communication request shared memory 162 are located in the kernel space 16. A shared memory for tasks operating in the user space 14 may also be located in the kernel space 16. The general-purpose OS scheduler 161, the real-time communication request shared memory 162, and the shared memory are similar to the general-purpose OS scheduler 161, the real-time communication request shared memory 162, and the shared memory described in the comparative example.

Application units 141-1, 141-2, . . . (application units 141), a shared library 142 for processing real-time communication requests, a shared library 143 containing a real-time communication API, and a real-time communication unit 151 are located in the user space 14. Apart from operating on the guest OS 13, the application units 141, the shared library 142 for processing real-time communication requests, and the shared library 143 containing the real-time communication API are similar to the application units 141, the shared library 142 for processing real-time communication requests, and the shared library 143 containing the real-time communication API described in the comparative example.

The real-time communication unit 151 communicates in real time in a production control system based on communication requests from the application units 141. Specifically, the real-time communication unit 151 receives communication requests from the application units 141 and transmits and receives data based on the communication requests. By the nature of the processing executed by the real-time communication unit 151, the timing of transmission and reception of frames and the like needs to be matched to the controller 21 or the PC 22, and real-time responsiveness thus required. The real-time communication unit 151 also preferably operates as a task independent from the application units 141. Communication by the real-time communication unit 151 with other devices is thereby performed without delay. For each virtual machine, the real-time communication unit 151 detects a diagnostic index related to real-time communication processing. When a virtual machine has a diagnostic index whose value exceeds a predetermined threshold, the real-time communication unit 151 judges that the virtual machine has a possibility of experiencing unstable operation. In other words, at least one physical PC (for example, the physical PC 11-1) among the plurality of physical PCs 11 judges whether a virtual machine has a possibility of experiencing unstable operation based on a diagnostic index related to the real-time communication processing. Details of the real-time communication unit 151 according to the present embodiment are provided below.

The real-time communication unit 151 includes a real-time communication interface 152, a real-time communication notification unit 153, a transmission buffer 154, a self-diagnostic unit 155, a self-diagnostic index storage 156, and a diagnosis result notification unit 157. The real-time communication interface 152 includes a request buffer 158. The real-time communication notification unit 153, the transmission buffer 154, and the request buffer 158 are respectively the same as the real-time communication notification unit 193, the transmission buffer 194, and the request buffer 197 described in the comparative example.

The real-time communication interface 152 has the functions of receiving requests from the application units 141 and providing a response to the requests to the application units 141 via the shared library 142 for processing real-time communication requests and the shared library 143 containing the real-time communication API. When the received communication request is a data transmission request, the real-time communication interface 152 retrieves the transmission request from the request buffer 158 and executes transmission processing.

The self-diagnostic unit 155 detects a diagnostic index related to real-time communication processing of the real-time communication unit 151 operating on each virtual machine and judges whether the value of the diagnostic index exceeds a predetermined threshold. When the value of the diagnostic index exceeds a predetermined threshold, the self-diagnostic unit 155 judges that unstable operation might occur on the virtual machine on which the real-time communication unit 151 exhibiting the value of the diagnostic index operates. The self-diagnostic unit 155 notifies the diagnosis result notification unit 157 that the virtual machine has a possibility of experiencing unstable operation. The self-diagnostic unit 155 can refer to the self-diagnostic index storage 156 when detecting the diagnostic index. The self-diagnostic index storage 156 is similar to the self-diagnostic index storage 196 described in the comparative example.

Examples of the diagnostic index detected by the self-diagnostic unit 155 include (1) CPU load (CPU usage) and (2) responsiveness (response time), described below, but these examples are not limiting.

(1) CPU load: the self-diagnostic unit 155 acquires the value of the CPU usage by the real-time communication unit 151 from the guest OS 13. The guest OS 13 includes an interface for a program to acquire performance data in the guest OS 13. The value of the CPU usage of each task is included in the performance data. When the CPU usage of the real-time communication unit 151 exceeds a predetermined threshold, the self-diagnostic unit 155 judges that unstable operation might occur. The self-diagnostic unit 155 may detect the possibility of unstable operation based on another diagnostic index. For example, the self-diagnostic unit 155 may acquire information such as the overall CPU usage of the guest OS 13 and the number of virtual processors 123 allocated to the virtual hardware 122 on which the guest OS 13 operates. The self-diagnostic unit 155 can judge that unstable operation might occur when the result of judgment by combining a plurality of these values exceeds a predetermined threshold (for example, 30% CPU usage when the number of cores in the CPU is four, 15% CPU usage when the number of cores in the CPU is eight, etc.).

(2) Responsiveness: the self-diagnostic unit 155 judges that unstable operation might occur when the responsiveness of real-time communication unit 151 has diminished. Specifically, the self-diagnostic unit 155 acquires the number of retries that occur when the real-time communication unit 151 transmits a frame. A transmission retry occurs when the real-time communication unit 151 has to wait for processing. When retries are frequent, the real-time responsiveness of communication can be considered to be impaired. Accordingly, when the number of retries occurring for one frame exceeds a predetermined threshold, or when the total number of transmission retries during a predetermined time exceeds a predetermined threshold, the self-diagnostic unit 155 can judge that unstable operation might occur.

Referring to FIGS. 4 and 5, the diagnosis result notification unit 157 provides a judgment unit 171 of an NMS 17, described below, with the notification received from the self-diagnostic unit 155. The self-diagnostic unit 155 may, however, notify the judgment unit 171 of the NMS 17 of the above-described possibility of unstable operation without going through the diagnosis result notification unit 157.

The management apparatus (such as an NMS) 17 can communicate with each physical PC 11 via a control network 20, for example. The NMS 17 can include the judgment unit 171 and the communication unit 172. The judgment unit 171 can be implemented using one or a plurality of physical processors. The communication unit 172 can be implemented using one or a plurality of communication interfaces. The management apparatus 17 is not limited to an NMS, however, and can be implemented using any computer that includes the judgment unit 171 and the communication unit 172. In the example described below, the virtual machine 126-1-1 operating on the physical PC 11-1 has a possibility of experiencing unstable operation, and the virtual machine 126-1-2 operating on the physical PC 11-1 is migrated to the physical PC 11-2 by live migration. In this case, the diagnosis result notification unit 157 of the physical PC 11-1 transmits a notification to the judgment unit 171 of the NMS 17 indicating that the virtual machine 126-1-1 has a possibility of experiencing unstable operation.

Upon receiving the notification from the diagnosis result notification unit 157 of the physical PC 11-1 via the control network 20, for example, the judgment unit 171 of the NMS 17 judges whether one of the virtual processors 123-1-1, 123-1-2, 123-1-3 of the physical PC 11-1 is free.

When one of the virtual processors 123-1-1, 123-1-2, 123-1-3 of the physical PC 11-1 is free, the judgment unit 171 transmits an instruction to the communication unit 172 for allocation of a virtual processor (i.e, the "free" virtual processor) of the physical PC 11-1 to the virtual machine 126-1-1 that has a possibility of experiencing unstable operation. Referring to FIG. 5, the communication unit 172 transmits a command based on the instruction from the judgment unit 171 to the virtualization unit 12 of the physical PC 11-1 via the control network 20, for example. The virtualization unit 12 of the physical PC 11-1 executes the command received from the communication unit 172 of the NMS 17. In other words, when a virtual processor of the physical PC 11-1 is free, the NMS 17 instructs the physical PC 11-1 to allocate the virtual processor to the virtual machine 126-1-1 that has a possibility of experiencing unstable operation. The physical PC 11-1 then allocates the virtual processor to the virtual machine 126-1-1 based on the instruction from the NMS 17.

Conversely, when none of the virtual processors 123-1-1, 123-1-2, 123-1-3 of the physical PC 11-1 is free, the judgment unit 171 transmits an instruction to the communication unit 172 for performing live migration of the virtual machine 126-1-2, which is capable of live migration. The judgment unit 171 also transmits an instruction to the communication unit 172 for allocating the virtual processor 123-1-2, secured in the physical PC 11-1 by live migration, to the virtual machine 126-1-1. The communication unit 172 transmits a command based on the instructions from the judgment unit 171 to the virtualization unit 12 of the physical PC 11-1. The virtualization unit 12 of the physical PC 11-1 executes the command received from the communication unit 172. In other words, when no virtual processor of the physical PC 11-1 is free, the NMS 17 instructs the physical PC 11-1 to secure the virtual processor 123-1-2 on the physical PC 11-1 by performing live migration of the virtual machine 126-1-2 capable of live migration and to allocate the virtual processor 123-1-2 to the virtual machine 126-1-1. Based on the instruction from the NMS 17, the physical PC 11-1 allocates the virtual processor 123-1-2, secured on the physical PC 11-1 by live migration, to the virtual machine 126-1-1. "Live migration" refers to saving the processing content of a virtual machine operating on a certain physical PC and then moving the virtual machine to another physical PC, restoring the processing content of the virtual machine on the other physical PC, and restarting the processing. The operations of the virtual machine are temporarily suspended for several milliseconds to several seconds during execution of the live migration, but the processing content is not lost.

A method of selecting the virtual machine 126-1-2 for live migration, a method of determining the physical PC 11-2 that becomes the destination of live migration, and a method of performing the live migration are described below in detail.

First, an example method of selecting the virtual machine 126-1-2 targeted for live migration is described. The judgment unit 171 of the NMS 17 first acquires information of the virtual machines 126-1-1, 126-1-2, 126-1-3 operating on the physical PC 11-1. Information such as the type of applications running on the virtual machines 126-1-1, 126-1-2, 126-1-3 and the virtual machine IDs is included in the "information of the virtual machines". Subsequently, the judgment unit 171 selects the virtual machine 126-1-2 capable of live migration as the target of live migration from among the virtual machines 126-1-1, 126-1-2, 126-1-3 operating on the physical PC 11-1. At this time, the judgment unit 171 may select a virtual machine with a low operation priority as the virtual machine 126-1-2 capable of live migration. The "virtual machine with a low operation priority" refers to a virtual machine with an operation priority equal to or less than a predetermined value. In other words, the virtual machine with a low operation priority refers to a virtual machine, among the virtual machines 126-1-1, 126-1-2, 126-1-3 operating on the physical PC 11-1, that has little effect on the production control system. Accordingly, the real-time responsiveness can be ensured while reducing the effect on the production control system.

Next, an example method of determining the physical PC 11-2 that becomes the destination of live migration is described. First, the communication unit 172 of the NMS 17 communicates with each of the physical PCs 11-1, 11-2, 11-3 and receives the allocation status of the virtual processors with respect to the virtual machines operating on the physical PCs 11-1, 11-2, 11-3. Subsequently, the communication unit 172 notifies the judgment unit 171 of the received allocation status of the processors. The judgment unit 171 then determines that the physical PC 11-2 will be the live migration destination of the virtual machine 126-1-2 based on the allocation status of the virtual processor 123-1-2 to the virtual machine 126-1-2 operating on the physical PC 11-1 and the allocation status of virtual processors to the virtual machines operating on the physical PCs 11-2, 11-3 other than the physical PC 11-1. In other words, the NMS 17 determines the live migration destination of the virtual machine 126-1-2 based on the allocation conditions of virtual processors to virtual machines operating on at least one physical PC 11 among the plurality of physical PCs 11.

The NMS 17 may determine that the physical PC 11-2 is the live migration destination based on the processing performance of the plurality of physical PCs 11. Examples of the "processing performance" include the CPU performance or the memory access performance of the physical PCs. For example, the judgment unit 171 of the NMS 17 may compare the processing performance of the physical PC 11 that is the source of live migration and the processing performance of the physical PC that is a candidate for the live migration destination and determine that a physical PC 11 with a similar, preferably identical, processing performance is the live migration destination.

The NMS 17 may determine the physical PC 11 that is the live migration destination based on the amount of virtual resources of the plurality of physical PCs 11. The "amount of virtual resources" includes the usage of the virtual processors, the usage of virtual memory, and the like. For example, the judgment unit 171 of the NMS 17 may determine that the PC 11-2 that has sufficient virtual resources to run the virtual machine 126-1-2 targeted for live migration is the live migration destination. When a plurality of physical PCs 11 have sufficient virtual resources, the judgment unit 171 may determine that the physical PC 11-2 that has a similar processing capability to the physical PC 11-1 that is the live migration source and that has many free virtual resources is the live migration destination. The judgment unit 171 may more preferably determine that the physical PC 11-2, among the plurality of physical PCs 11, that has an identical processing capability to the physical PC 11-1 and that has many free virtual resources is the live migration destination.

Next, an example method of performing the live migration is described. The judgment unit 171 transmits an instruction, to the communication unit 172, indicating to perform live migration of the virtual machine 126-1-2 selected by the above-described selection method to the physical PC 11-2 determined by the above-described determination method. The communication unit 172 then transmits a command to the virtualization unit 12 of the physical PC 11-1 and the virtualization unit 12 of the physical PC 11-2 to perform live migration of the virtual machine 126-1-2. As a result, the virtualization unit 12 of the physical PC 11-1 then allocates the virtual processor 123-1-2, secured inside the physical PC 11-1 by live migration of the virtual machine 126-1-2, to the virtual machine 126-1-1. In this way, the effect on the production control system of performing live migration can be further reduced.

The judgment unit 171 of the NMS 17 can refer to the operation priority table, illustrated in FIG. 6, when performing the selection method. The operation priority table can include information related to the "operation priority", the "live migration capability", and "virtual machine ID". The information listed in the "operating application" and the "notes" columns of FIG. 6 is merely included for illustration and need not be included in the actual operation priority table. The operation priority table may be set in advance by an engineering server or the like or may be stored in advance in a storage of the NMS 17 or the like. However, these examples are not limiting. The operation priority table is described below in detail.

The information listed in the "live migration capability" column indicates whether the virtual machine is capable of live migration. For example, live migration is set to "not capable" for a virtual machine that cannot temporarily suspend processing due to the occurrence of a watchdog timer (WTD) or the like or a virtual machine that can only operate on a particular physical PC due to access authority or the like.

The information listed in the "virtual machine ID" column indicates identification information of each virtual machine. The virtual machine ID is uniquely set throughout the real-time communication processing system. When a predetermined symbol is appended to the virtual machine ID column, then the information of the application operating on the virtual machine serves as a basis for every virtual machine on which the application is operating to become a candidate for live migration. The setting "not capable of live migration" is prioritized, however, in cases such as when an I/O module predictive maintenance application (capable of live migration) is operating on a virtual machine (virtual machine ID: VM1) that is not capable of live migration.

The information in the "operation priority" column is set in advance, and a smaller number in this column indicates higher priority for operation of the virtual machine. For example, the operation priority is set high for a virtual machine (virtual machine ID: VM1) when the virtual machine is running an application that has a server function, such as a data server, and suspension of the server function would greatly affect the production control system. In FIG. 6, the operation priority of this virtual machine (virtual machine ID: VM1) is set to the highest level, "1". When a certain application is only operating on one virtual machine (virtual machine ID: VM2), the operation priority is set high. In FIG. 6, the operation priority of this virtual machine (virtual machine ID: VM2) is set to "2". On the other hand, when the same application is running on two virtual machines (virtual machine ID: VM3, VM4), the operation priority of one virtual machine (virtual machine ID: VM4)

is set lower than the operation priority of the other virtual machine (virtual machine ID: VM3). In FIG. 6, the operation priority of one virtual machine (virtual machine ID: VM4) is set to "3", and the operation priority of the other virtual machine (virtual machine ID: VM3) is set to "1". If the one virtual machine (virtual machine ID: VM4) is suspended, this enables the application to operate on the other virtual machine (virtual machine ID: VM3). The operation priority is set low for a virtual machine on which a client function is operating, such as an HMI, since suspension of one virtual machine would have little effect on the production control system. When the operating cycle of an application operating on a virtual machine is long, the operation priority is set low. Examples include an operating cycle of once per week in a data collection application. When an application operating on a virtual machine (virtual machine ID: VM5, VM6) generates a large volume of data, the application is only executed when virtual resources are free. The operation priority is therefore set low.

When no virtual machine is capable of live migration, the judgment unit 171 of the NMS 17 transmits an instruction to the communication unit 172 to suspend the virtual machine 126-1-1. Next, referring to FIG. 5, the communication unit 172 transmits a command based on the instruction from the judgment unit 171 to the virtualization unit 12 of the physical PC 11-1. The virtualization unit 12 of the physical PC 11-1 then executes the command received from the communication unit 172 of the NMS 17. Operation of the virtual machine 126-1-1 is thereby suspended.

Next, processing procedures of a real-time communication processing system 1 according to the present embodiment are described with reference to FIG. 7.

First, in step S100, the physical PC 11-1 detects a diagnostic index related to real-time communication processing for each virtual machine and judges whether the value of the diagnostic index exceeds a predetermined threshold. When the value of the diagnostic index exceeds a predetermined threshold (step S100: YES), the processing proceeds to step S110. When the value of the diagnostic index does not exceed a predetermined threshold (step S100: NO), the processing proceeds to step S160.

Referring to FIGS. 4 and 5, in step S100, for example, the self-diagnostic unit 155 of each physical PC 11-1 first detects a diagnostic index related to real-time communication processing for each virtual machine and judges whether the value of the diagnostic index exceeds a predetermined threshold. Next, when the value of the diagnostic index exceeds a predetermined threshold, the self-diagnostic unit 155 judges that the virtual machine 126-1-1 has a possibility of experiencing unstable operation and notifies the diagnosis result notification unit 157. Next, the diagnosis result notification unit 157 provides the judgment unit 171 of the NMS 17 with the notification received from the self-diagnostic unit 155. The self-diagnostic unit 155 may, however, notify the judgment unit 171 of the NMS 17 of the above-described possibility of unstable operation without going through the diagnosis result notification unit 157.

In the case of proceeding to step S110 from step S100, the physical PC 11-1 transmits a notification to the NMS 17 in step S110 indicating the existence of the virtual machine 126-1-1 that has a possibility of experiencing unstable operation related to real-time communication processing.

Subsequently, in step S120, the NMS 17 judges whether a virtual processor of the physical PC 11-1 that transmitted the notification in step S110 is free. When a virtual processor is free (step S120: YES), the processing proceeds to step S130. When no virtual processor is free (step S120: NO), the processing proceeds to step S140.

The following processing can be executed in step S120, for example. Referring to FIG. 4, the judgment unit 171 of the NMS 17 judges whether a virtual processor of the physical PC 11-1 is free. At this time, the judgment unit 171 may collect information from the virtual hardware 122-1 or the physical PC 11-1 and make the judgment based on this information.

In the case of proceeding to step S130 from step S120, i.e. when a virtual processor is free on the physical PC 11-1, the NMS 17 instructs the physical PC 11-1 in step S130 to allocate the free virtual processor to the virtual machine that has the possibility of experiencing unstable operation. A virtual processor is thereby allocated to the virtual machine 126-1-1. The processing then proceeds to step S160.

The following processing can be executed in step S130, for example. Referring to FIGS. 4 and 5, the judgment unit 171 of the NMS 17 first issues an instruction to the communication unit 172 for allocating a free virtual processor of the physical PC 11-1 to the virtual machine 126-1-1. Next, the communication unit 172 transmits a command based on the instruction from the judgment unit 171 to the virtualization unit 12 of the physical PC 11-1. The virtualization unit 12 of the physical PC 11-1 then executes the above-described command related to step S130. A free virtual processor is thereby allocated to the virtual machine 126-1-1. After the possibility of unstable operation on the virtual machine 126-1-1 is resolved, the virtualization unit 12 appropriately releases the virtual processor allocated to the virtual machine 126-1-1.

On the other hand, in the case of proceeding to step S140 from step S120, i.e. when there is no free virtual processor on the physical PC 11-1, the NMS 17 performs live migration in step S140 on the virtual machine 126-1-2, which is capable of live migration and has a low operation priority among the virtual machines 126-1-1, 126-1-2, 126-1-3 operating on the physical PC 11-1 that transmitted the notification in step S110.

Referring to FIG. 8, the processing of step S140 is described in detail.

When the processing of step S140 begins, the NMS 17 acquires information of the virtual machines operating on the physical PC 11-1 in step S141.

Subsequently, in step S142, the NMS 17 selects the virtual machine 126-1-2, which is capable of live migration and has a low operation priority among the virtual machines 126-1-1, 126-1-2, 126-1-3 operating on the physical PC 11-1, as the target of live migration. The method of selecting the virtual machine 126-1-2 as the target of live migration is as described above.

Subsequently, in step S143, the NMS 17 determines that the physical PC 11-2 is the live migration destination of the virtual machine 126-1-2. The method of determining the physical PC 11-2 that is the live migration destination is as described above.

Subsequently, in step S144, the NMS 17 instructs the physical PC 11-1 to perform live migration destination of the virtual machine 126-1-2 to the physical PC 11-2.

Subsequently, in step S145, the physical PC 11-1 performs live migration of the virtual machine 126-1-2. The method of performing live migration is as described above. In this way, the virtual processor 123-1-2 is secured on the physical PC 11-1, and the processing of step S140 ends.

Returning to FIG. 7, in step S150, the physical PC 11-1 allocates the virtual processor 123-1-2, secured on the physical PC 11-1 by live migration in step S140, to the virtual machine 126-1-1. The processing then proceeds to step S160. The virtual processor 123-1-2 may be allocated after live migration is complete, and the virtualization unit 12 of the physical PC 11-1 may appropriately release the virtual processor 123-1-2 allocated to the virtual machine 126-1-1 after the possibility of unstable operation on the virtual machine 126-1-1 is resolved.

Subsequently, real-time communication is performed in step S160, and the present processing ends. The processing in step S160 is similar to the processing in steps S14 to S17 in the comparative example. Hence, a description thereof is omitted. The processing of step S160 may be executed in parallel, without waiting for completion of the processing of steps S100 to S150, when a delay in the processing of steps S100 to S150 would cause a delay in the processing of step S160 and potentially impede the real-time responsiveness of real-time communication.

The following effects are obtained with the present embodiment. The present embodiment allocates a virtual processor to a virtual machine that has a possibility of experiencing unstable operation related to real-time communication processing and can thereby ensure real-time responsiveness. When no virtual processor is free, a virtual processor secured by live migration is allocated to the virtual machine that has a possibility of experiencing unstable operation. The real-time responsiveness required for a production control system can thus be ensured as compared to when the virtual machine is completely suspended.

The present disclosure is based on drawings and embodiments, but it should be noted that a person of ordinary skill in the art could make a variety of changes or modifications based on the present disclosure. Therefore, such changes and modifications are to be understood as included within the scope of the present disclosure. For example, the functions and the like included in the various steps and the like may be reordered in any logically consistent way. Furthermore, a plurality of steps or the like may be combined into one, or a single step or the like may be divided.

For example, a first modification may be as follows. When there is no virtual machine capable of live migration, the time interval at which the real-time communication interface processes communication requests from the application units may be adjusted for the virtual machine that has a possibility of experiencing unstable operation related to real-time communication processing. The time interval may be adjusted in a similar way to the comparative example. The first modification can adjust the time interval at which the real-time communication interface processes communication requests from the application units to reduce the possibility of unstable operation on a virtual machine.

As a second modification, each physical PC may include an application representative unit that operates as an independent task from the application unit, receives a communication request from the application unit, stores the communication request in a dedicated storage within the task, and then passes the communication task retrieved from the storage to the real-time communication unit. Consequently, application units do not interfere with each other's communication requests, thereby ensuring safety. In this context, "interfere" refers to reading or overwriting a communication request without permission. Accordingly, the second modification can protect application units from the risk of transmission/reception frames being tampered with or spied on.

INDUSTRIAL APPLICABILITY

The present disclosure provides a real-time communication processing system and a real-time communication processing method capable of ensuring the real-time responsiveness necessary for a production control system while using a general-purpose OS scheduler.

The invention claimed is:

1. A real-time communication processing system to be used in a production control system, the real-time communication processing system comprising:
   a plurality of computers; and
   a management apparatus capable of communicating with each computer, said management apparatus comprising at least one physical processor;
   wherein at least one virtual machine operates on at least one computer among the plurality of computers;
   wherein the at least one computer transmits a notification to the management apparatus when a virtual machine on the computer has a possibility of experiencing unstable operation related to real-time communication processing;
   wherein when a virtual processor of the computer that transmitted the notification is free, the at least one physical processor of the management apparatus instructs the computer that transmitted the notification to allocate the virtual processor to the virtual machine that has the possibility of experiencing unstable operation; and
   wherein when a virtual processor of the computer that transmitted the notification is not free, the at least one physical processor of the management apparatus instructs the computer that transmitted the notification to perform live migration of a virtual machine capable of live migration on the computer that transmitted the notification to another computer among the plurality of computers, and allocates, to the virtual machine that has the possibility of experiencing unstable operation, the virtual processor secured by the live migration of the virtual machine on the computer that transmitted the notification.

2. The real-time communication processing system of claim 1, wherein the at least one physical processor of the management apparatus selects a virtual machine with a low operation priority as the virtual machine capable of live migration.

3. The real-time communication processing system of claim 1, wherein the at least one physical processor of the management apparatus determines a live migration destination of the virtual machine based on an allocation status of the virtual processor relative to the virtual machine operating on the at least one computer.

4. The real-time communication processing system of claim 1, wherein the at least one physical processor of the management apparatus determines a live migration destination of the virtual machine based on processing performance of the plurality of computers.

5. The real-time communication processing system of claim 1, wherein the at least one physical processor of the management apparatus determines a live migration destination of the virtual machine based on an amount of virtual resources of the plurality of computers.

6. The real-time communication processing system of claim 1, wherein the at least one computer determines whether the virtual machine has the possibility of experiencing unstable operation based on a diagnostic index related to the real-time communication processing.

7. A real-time communication processing method to be used in a production control system, the real-time communication processing method comprising:

using at least one computer to transmit a notification to a management apparatus when a virtual machine on the computer has a possibility of experiencing unstable operation related to real-time communication processing;

using the management apparatus, when a virtual processor of the computer that transmitted the notification is free, to instruct the computer that transmitted the notification to allocate the virtual processor to the virtual machine that has the possibility of experiencing unstable operation; and using the management apparatus, when a virtual processor of the computer that transmitted the notification is not free, to instruct the computer that transmitted the notification to perform live migration of a virtual machine capable of live migration on the computer that transmitted the notification to another computer among the plurality of computers, and to allocate, to the virtual machine that has the possibility of experiencing unstable operation, the virtual processor secured by the live migration of the virtual machine on the computer that transmitted the notification.

\* \* \* \* \*